Patented Feb. 7, 1933

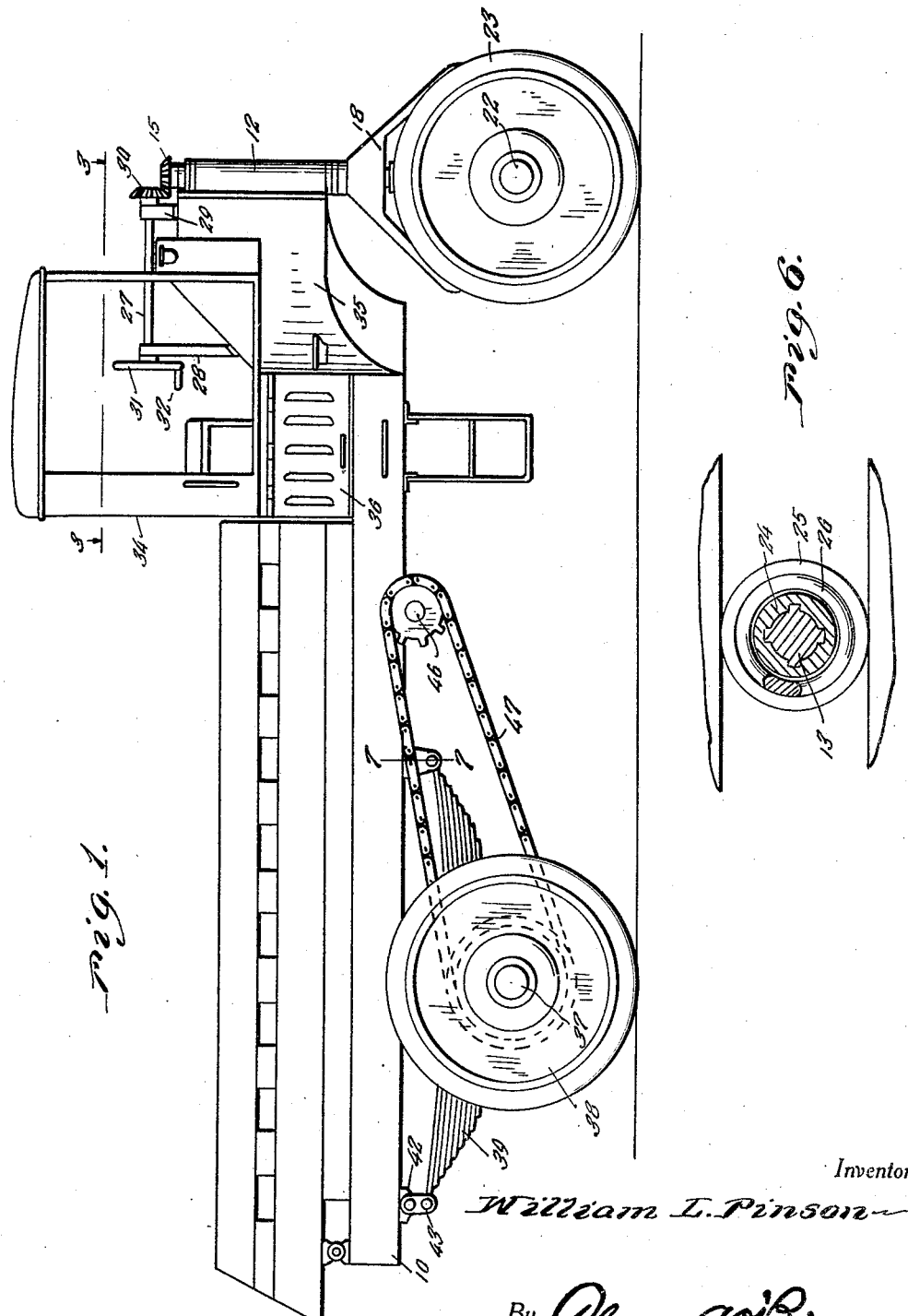

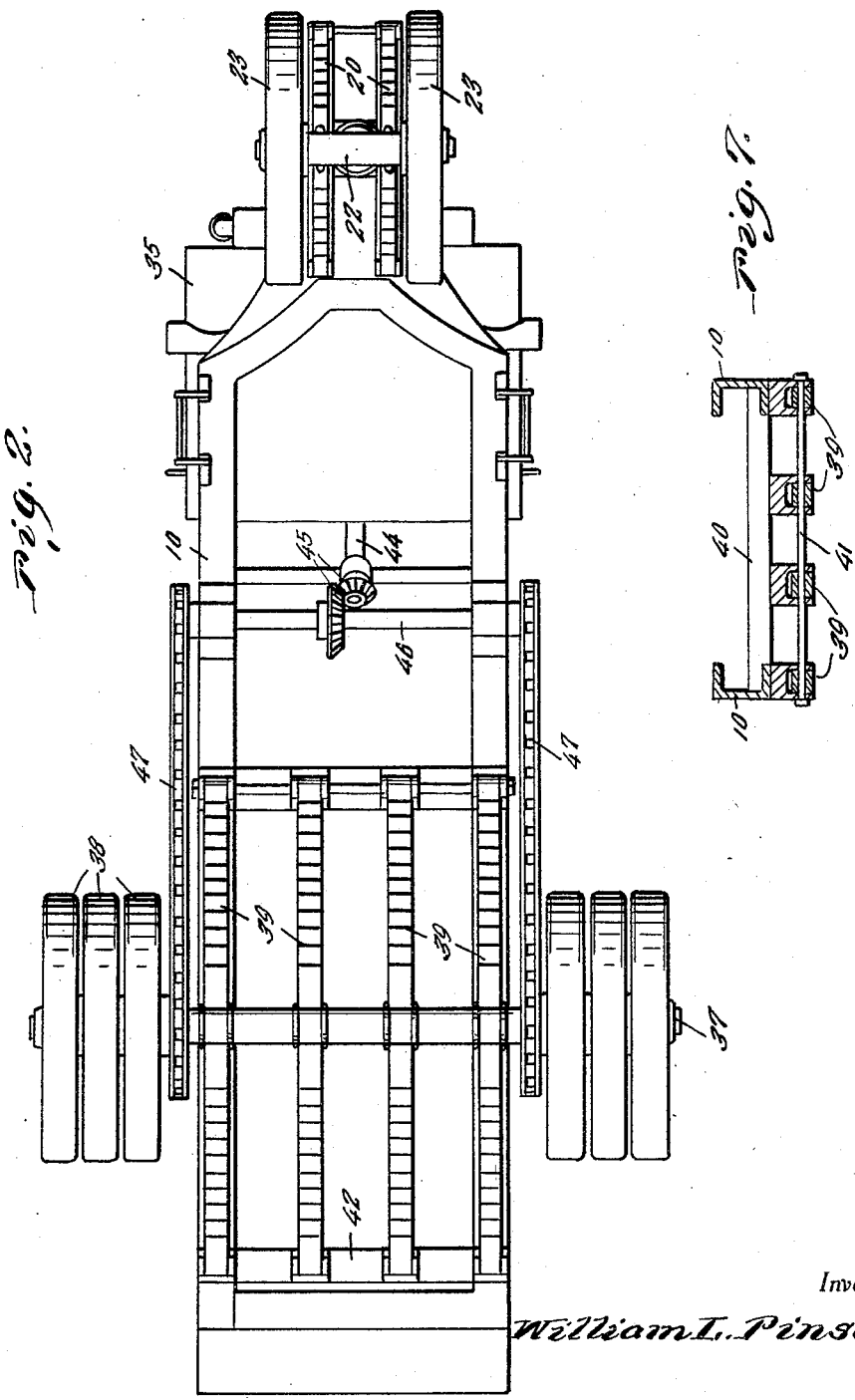

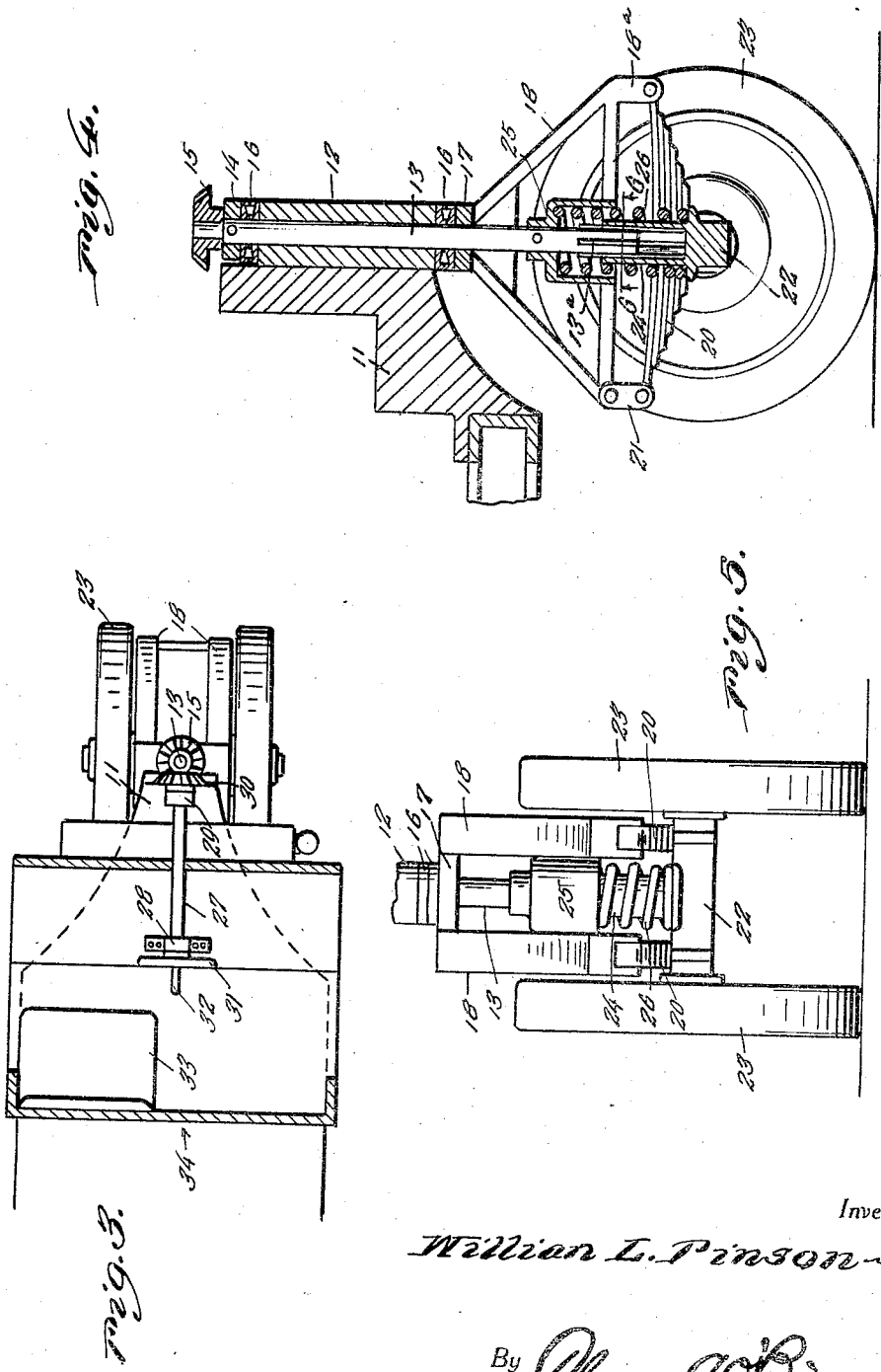

1,896,419

UNITED STATES PATENT OFFICE

WILLIAM LESLIE PINSON, OF BARBOURSVILLE, WEST VIRGINIA, ASSIGNOR TO C. L. HARSHBARGER, OF MILTON, WEST VIRGINIA

SELF-PROPELLED VEHICLE

Application filed February 12, 1932. Serial No. 592,635.

This invention relates broadly to self propelled vehicles, preferably of the motor driven type, and in accordance with the present invention, an improved motor driven truck is provided equipped with steering mechanism which will enable the truck to make sharp turns so that the truck will be found especially useful in excavation operations.

The invention together with its numerous objects and advantages will be best understood from a study of the following description, taken in connection with the accompanying drawings wherein:

Figure 1 is a side elevational view of the improved truck.

Figure 2 is a bottom plan view.

Figure 3 is a horizontal sectional view taken substantially on the line 3—3 of Figure 1.

Figure 4 is a vertical sectional view illustrating the steering mechanism.

Figure 5 is a front elevational view showing the manner of mounting the front axle.

Figure 6 is a detail sectional view taken substantially on the line 6—6 of Figure 4, and Figure 7 is a detail sectional view taken substantially on the line 7—7 of Figure 1.

With reference more in detail to the drawings, it will be seen that my improved truck includes among other parts, a chassis frame 10 on the forward end of which is mounted a block 11 shown in detail section in Figure 4, and it will be noted that the rear portion of the block is preferably stepped as shown. On the front of the block 11 is suitably mounted a vertically disposed fixed gearing 12.

Journalled in the bearing 12 is a vertical steering shaft 13 the upper end of which is provided with a collar 14 and above the collar with a bevel gear 15. At the upper and lower end of the bearing 12 are thrust bearings 16, the lower bearing 16 resting on a cross bar 17 which connects the upper end of a pair of relatively spaced substantially triangular shaped brackets 18.

Each of the brackets 18 at its lower end is connected to a conventional multiple leaf spring 20 that is pivoted at its forward end to a lug 18a provided at the corresponding end of a bracket 18, and at its rear end by a shackle 21.

The springs 20 are bolted to the proximate ends of a relatively short axle 22 that is supported by wheels 23.

The axle 22 intermediate its end is provided with a vertical sleeve or socket 24 that is provided with internal grooves. The socket or sleeve 24 accommodates the lower end of the vertical steering shaft 13 which end of said shaft is provided with keys 13a engaging the keyways or grooves of the sleeve or socket 24 so that, as is apparent, rotative movement of the shaft 13 will be imparted to the axle 22 for changing the direction of travel to the right or left.

Fixed on the lower portion of the shaft 13 is a collar 25 having a depending skirt portion which receives the upper end of a shock absorbing spring 26. As shown, spring 26 is disposed about the sleeve or socket 24 and the lower end of the shaft 13, one end of the spring bearing on the axle 22, and the upper end of the spring thus acting oppositely on the axle 22 and shaft 13.

A horizontal steering rod 27 is journalled in bearing brackets 28, 29 and on its forward end the steering rod 27 is equipped with a bevel gear 30 meshing with the bevel gear 15. On its rear end the steering rod 27 is provided with a hand wheel 31 having a lateral handle 32. As shown in Figure 1 the wheel 31 and the handle 32 are disposed so as to be conveniently manipulated by an operator sitting in the driver's seat 33 provided within a cabin 34 mounted at the forward end of the chassis 10.

It will be also noted, that the forward end portion of the chassis 10, together with the block 11 is suitably disposed within a housing 35 which enhances the appearance of the truck. It will be also noted that the prime mover is located beneath the cabin 34, the hood of the prime mover being designated by the reference character 36.

The rear portion of the truck is supported by an axle 37 the ends of which are supported by triple wheels 38.

The axle of the housing 37 is supported through the medium of a plurality of relatively spaced longitudinally extending multiple leaf springs 39 suitably connected intermediate their ends, to the axle housing, and at their forward ends connected to a cross bar 40 of the chassis frame 10 through the medium of a single pivot bolt 41 that extends through the forward end of the uppermost leaves of the springs, and through pairs of ears depending from the cross bar 40. (See Figure 7.) The rear end of the uppermost leaves of said springs 39 are connected to a rear cross bar 42 through the medium of shackles 43.

The drive shaft of the motor is designated by the reference character 44 and this shaft has a gear connection 45 with a transverse shaft 46 that has driving connection with the rear axle through the medium of chain and sprocket means 47 arranged at relatively opposite sides of the truck. (See Figure 2.)

In addition to the above, and as shown in Figure 1, the truck will of course be provided with other paraphernalia and accessories necessary to the proper use of the truck as for example steps to enable one to climb on to the cabin 34 and the like.

From the foregoing then it will be seen that I have provided a self propelled vehicle, characterized by a steering apparatus which enables the vehicle to turn at sharp angles, thus permitting use of the truck in limited areas.

While I have described the invention somewhat in detail it is to be understood that in actual practice, many changes may be made therein which will readily suggest themselves to one skilled in the art as for example but a single steering wheel at the front of the truck may be used instead of two wheels as herein shown and other changes in the details of construction, combination and arrangement of elements may be resorted to without departing from the spirit of the invention.

It is therefore to be understood that I claim all such forms of the invention to which I am entitled in view of the requirements of the prior art and scope of the appended claims.

Having thus described my invention, what I claim as new is:

1. A dirigible wheel construction comprising an axle, wheels supporting said axle, a pair of oppositely disposed brackets, multiple leaf springs connecting said brackets with said axle, a bar connecting said brackets and provided with an aperture, a shaft extending through said bar and provided at one end with keys, and a socket on said axle provided with internal keyways receiving the keys on said end of said shaft.

2. A dirigible wheel construction comprising an axle, wheels supporting said axle, a pair of oppositely disposed brackets, multiple leaf springs connecting said brackets with said axle, a bar connecting said brackets and provided with an aperture, a shaft extending through said bar and provided at one end with keys, a socket on said axle provided with internal keyways receiving the keys on said end of said shaft, a collar fixed on said shaft, and a spring disposed about said socket and the proximate end of said shaft, and having one end bearing against said axle, and a relatively opposite end bearing against said collar.

3. In a self propelled vehicle, the combination, of a chassis frame, a block mounted on the forward end of said frame, a fixed vertical bearing carried by said block, and steering mechanism for the vehicle including a shaft journaled in said bearing, a wheel supported axle, yieldable means for supporting said axle for movement relative to said shaft in a plane perpendicular to the ground, a socket on said axle receiving the lower end of said shaft, and inter-engaging means on said socket and on said shaft slidably connecting said shaft with said socket and providing the sole means for transmitting movement of said shaft to the axle for changing the direction of the vehicle to the right or left.

4. In a vehicle, a steering mechanism therefore including, in combination, an axle, means for supporting the axle for turning movement to steer the vehicle toward the right or left, a fixed vertical member on said axle, a shaft having an end slidably engaged with said vertical member, inter-engaging means on said vertical member and on said shaft for transmitting movement of the shaft to the axle, a collar on said shaft, and a spring disposed about said end of the shaft and said vertical member between said collar and said axle.

In testimony whereof I affix my signature.
WILLIAM LESLIE PINSON.